| United States Patent [19] | [11] Patent Number: 4,684,700 |
|---|---|
| Wang et al. | [45] Date of Patent: *Aug. 4, 1987 |

[54] ADVANCED EPOXY RESINS PREPARED FROM TRIGLYCIDYL ETHERS AND DIHYDRI PHENOLS

[75] Inventors: Chun S. Wang; Wuu N. Chen, both of Lake Jackson; Robert L. Bowden, Angleton; Jody R. Berman, Lake Jackson, all of Tex.

[73] Assignee: The Dow Chemical Company, Midland, Mich.

[*] Notice: The portion of the term of this Patent subsequent to Aug. 5, 2003 has been disclaimed.

[21] Appl. No.: 829,364

[22] Filed: Feb. 14, 1986

[51] Int. Cl.[4] ............................................... C08G 59/32
[52] U.S. Cl. .................... 525/481; 525/507; 528/97; 528/98; 528/104; 428/209; 428/413; 428/901
[58] Field of Search ............................ 528/98, 104, 97; 428/209, 901, 413; 525/507, 481

[56] References Cited

U.S. PATENT DOCUMENTS

| 2,801,989 | 8/1957 | Farnham | 528/98 |
|---|---|---|---|
| 3,370,038 | 2/1968 | Barton et al. | 528/98 |
| 3,477,990 | 11/1969 | Dante et al. | 260/47 |
| 3,547,881 | 12/1970 | Mueller et al. | 260/47 |
| 3,787,451 | 1/1974 | Mah | 528/98 X |
| 4,216,304 | 8/1980 | Gutekunst et al. | 528/507 X |
| 4,390,664 | 6/1983 | Kanayama | 525/117 |
| 4,394,496 | 7/1983 | Schrader | 528/98 |
| 4,447,598 | 5/1984 | Caskey et al. | 528/489 |
| 4,604,317 | 8/1986 | Berman et al. | 528/98 X |

FOREIGN PATENT DOCUMENTS 858648 12/1970 Canada .
893191 2/1972 Canada .

*Primary Examiner*—Earl Nielsen
*Attorney, Agent, or Firm*—James G. Carter

[57] ABSTRACT

Advanced epoxy resin products are prepared by reacting a triglycidyl ether of a trihydric phenol such as the triglycidyl ether of 1,1,1-tri(hydroxyphenyl)methane with a dihydric phenol such as bisphenol A. These advanced epoxy resins are non-sintering solid resins useful in the preparation of electrical potting or molding compositions.

120 Claims, No Drawings

ADVANCED EPOXY RESINS PREPARED FROM TRIGLYCIDYL ETHERS AND DIHYDRI PHENOLS

BACKGROUND OF THE INVENTION

The present invention pertains to non-sintering epoxy resins prepared by advancing a triglycidyl ether of a trihydric phenol with a polyhydric phenol.

Triglycidyl ethers of trihydric phenols have been employed in the preparation of laminates. While they have good physical and mechanical properties when cured, they tend to pick up moisture from the atmosphere which detracts from their use in electrical applications. They are also semi-solid in physical form. In the preparation of semi-conductor integrated circuits, the semi-conductor industry prefers to employ epoxy resins which are non-sintering solids.

The present invention provides the electronics encapsulating industry with products which are solid, non-sintering and possess reduced tendencies to pick moisture.

SUMMARY OF THE INVENTION

The present invention pertains to advanced solid, non-sintering epoxy resins which result from reacting (A) at least one triglycidyl ether of a trihydric phenol with (B) at least one polyhydric phenol having an average hydroxyl functionality of not greater than about 3; wherein components (A) and (B) are employed in quantities which result in a non-sintering advanced epoxy resin.

The present invention also pertains to curable products which comprises the above advanced, solid, non-sintering epoxy resins and a curing quantity of at least one curing agent therefor.

The present invention further pertains to the products resulting from curing the above curable products.

DETAILED DESCRIPTION OF THE INVENTION

The advanced epoxy resins of the present invention can be prepared by reacting the triglycidyl ether of a trihydric phenol with a polyhydric phenol having an average aromatic hydroxyl functionality of not greater than about 3 in the presence of an advancement catalyst. The use of solvents is optional, but desired. Suitable such advancement catalysts include, for example, phosphonium compounds, ammonium compounds, organic phosphines and the like. Particularly suitable catalysts include, for example, ethyl triphenyl phosphonium acetate.acetic acid complex, tetrabutyl phosphonium acetate.acetic acid complex, ethyl triphenyl phosphonium iodide, tetrabutyl phosphonium iodide, ethyl triphenyl phosphonium phosphate, tetrabutyl phosphate, triphenyl phosphine, mixtures thereof and the like. These and other catalysts are more fully described by Dante et al in U.S. Pat. No. 3,477,990, by Mueller in U.S. Pat. No. 3,547,881, by Perry in U.S. Pat. No. 3,948,855, by Tyler et al in U.S. Pat. No. 4,366,295, by Perry in Canadian Pat. No. 893,191 and by Cragar in Canadian Pat. No. 858,648 all of which are incorporated herein by reference.

The reaction will proceed at most any temperature from about room temperature up to the decomposition temperature of the reactants, diluents and/or products; however, it is preferred to prepare the advanced resins of the present invention at temperatures of from about 50° C. to about 250° C., preferably from about 65° C. to about 200° C., most preferably from about 80° C. to about 180° C. The reaction can proceed at any pressure from reduced pressure up to the pressure limitation of the equipment.

The advancement reaction can, if desired, be conducted in the presence of solvents or diluents. Suitable such solvents or diluents include, for example, organic solvents such as, for example, aromatic hydrocarbons, ketones, glycol ethers, aliphatic alcohols, glycols and polyglycols, cyclic or acyclic ethers, mixtures thereof and the like. Particularly suitable solvents or diluents include, for example, toluene, xylene, acetone, methyl ethyl ketone, methyl isobutyl ketone, propylene glycol methyl ether, dipropylene glycol methyl ether, ethylene glycol n-butyl ether, propanol, n-butanol, polyoxyethylene glycol, dioxane, mixtures thereof and the like.

Since it is also desirable that epoxy resins for use in electrical applications also possess low total aliphatic halide (hydrolyzable aliphatic halide plus bound aliphatic halide) it is preferred to conduct the reaction in the presence of an alkali metal hydroxide such as, for example, sodium hydroxide, potassium hydroxide, lithium hydroxide and the like and a solvent mixture containing at least one each of an aromatic hydrocarbon, ketone, glycol ether or mixture thereof such as, for example, methyl ethyl ketone, toluene or mixture thereof and at least one solvent or diluent which contains at least one aliphatic hydroxyl group per molecule such as, for example, an aliphatic alcohol or an aliphatic glycol or polyglycol. Other suitable methods for preparing epoxy resins low in total aliphatic halide are disclosed.

The triglycidyl ethers and the dihydric phenols are usually employed in quantities which provide a phenolic hydroxyl to epoxy ratio of from about 0.01:1 to about 0.5:1, preferably from about 0.03:1 to about 0.3:1, most preferably from about 0.05:1 to about 0.2:1.

In order to be non-sintering, the advanced epoxy resins should have a Mettler softening point of at least about 78° C.

Suitable triglycidyl ethers of trihydric phenols which can be employed herein include, for example, those represented by the following formula I:

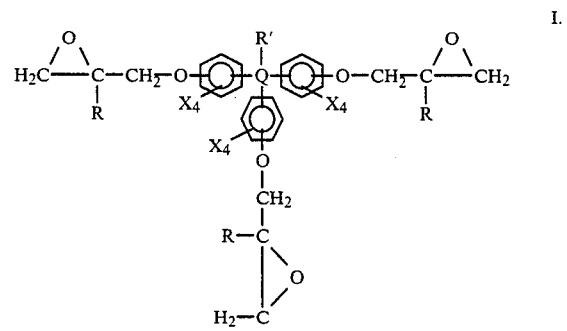

wherein Q is a tetravalent hydrocarbyl group having from 1 to about 12, preferably from about 1 to about 6 carbon atoms, most preferably from 1 to about 3 carbon atoms, each R independently is hydrogen or an aliphatic hydrocarbyl group having from 1 to about 3 carbon atoms; each R' is hydrogen or a hydrocarbyl group having from 1 to about 12, preferably from about 1 to about 6 carbon atoms; and each X is independently hydrogen, a monovalent hydrocarbyl group having from 1 to about 6, preferably from 1 to about 3 carbon atoms or a halogen, preferably chlorine or bromine. Particularly suitable triglycidyl ethers include those prepared by reacting hydroxybenzaldehyde, vanillin, salicylaldehyde, 3-methyl-4-hydroxybenzaldehyde, 2-methyl-4-hydroxybenzaldehyde, 3,5-dimethyl-4-hydroxybenzaldehyde, mixtures thereof and the like with phenol, cresol, dimethyl phenol, mixtures thereof and the like.

Suitable dihydric phenols which can be employed herein include, for example, those represented by the following formulas II–IV:

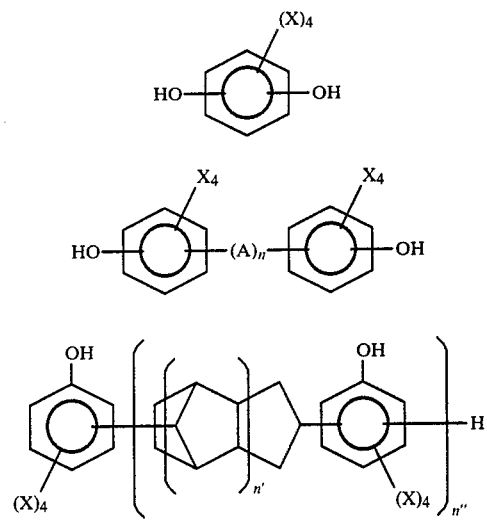

wherein each A is independently a divalent hydrocarbyl group having from about 1 to about 12, preferably from about 1 to about 6, most preferably from about 1 to about 3 carbon atoms, —O—, —S—, —S—S—,

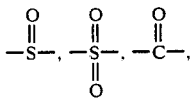

each X is independently hydrogen, a monovalent hydrocarbyl group having from 1 to about 6, preferably from 1 to about 3 carbon atoms or a halogen, preferably chlorine or bromine; n has a value of zero or 1; n' has a value from about 1 to about 5 and n" has a value from about 1 to about 3. Particularly suitable dihydric phenols include, for example, hydroquinone, resorcinol, catechol, biphenol, bisphenol A, bisphenol F, bisphenol K, dicyclopentadiene-phenol novolac resin, halogenated derivatives thereof.

The advanced epoxy resins of the present invention are useful in the preparation of coatings, castings, electrical and structural laminates and composites, potting and molding compositions for the electronic industry, adhesives and the like.

If desired, the curable compositions and the cured products of the present invention can contain pigments, dyes, filers, flow control agents, leveling agents, flame retardant agents, reinforcing materials, plasticizers, extenders, mold release agents and the like in any and all combinations.

The following examples are illustrative of the invention but are not to be construed as to limiting the scope thereof in any manner.

EXAMPLE 1

To a one-liter reaction vessel equipped with temperature control and indicating means, reflux condenser and a mechanical stirrer was added 100 g (0.61 epoxy equiv.) of a triglycidyl ether of 1,1,1-tri(hydroxyphenyl)methane having an epoxide equivalent weight of about 165 containing 750 ppm (parts per million by weight) hydrolyzable chloride and 1950 ppm total aliphatic chloride was dissolved in 100 g of a 75/25 by weight mixture of methyl ethyl ketone (MEK)/toluene. To this mixture were added 3.5 g (0.064 aromatic hydroxyl equiv.) of resorcinol and 0.3 g of polyoxyethylene glycol having an average weight average molecular weight of about 400 and the resultant mixture was heated to 85° C. with stirring. After the mixture reached 85° C., 0.89 g (1.3 equiv. of KOH per equiv. of total halide) of 45% aqueous potassium hydroxide was added and the reaction mixture was maintained at 8520 C. for about 6 hours (21,600 s) with good agitation. The resultant reaction mixture was diluted to 20% solids concentration with a 75/25 MEK/toluene solvent mixture, neutralized with dilute aqueous phosphoric acid. The product was then washed with deionized water several times to remove KCl. The organic phase from the water washes was placed on a rotary evaporator under a full vacuum at 170° C. to remove the solvent completely. A non-sintering solid resin with a Mettler softening point of 82° C. having an epoxide equivalent weight (EEW) of 197, a hydrolyzable chloride content of 10 ppm and a total chloride content of 748 ppm was obtained.

EXAMPLE 2

The procedure of Example 1 was repeated with 100 g (0.57 equiv.) of a triglycidyl ether of (hydroxyphenyl)-[di-(hydroxy-2-methylphenyl)]methane having an EEW of 175 containing 455 ppm hydrolyzable chloride and 1868 ppm of total aliphatic chloride was reacted with 3.5 g (0.064 equiv.) of resorcinol. The resultant non-sintering advanced epoxy resin had a Mettler softening point of 83.5° C., an EEW of 205, a hydrolyzable chloride content of 9 and a total aliphatic chloride content of 696.

EXAMPLES 3–7 and COMPARATIVE EXPERIMENT A

The procedure of Example 1 was employed to react a triglycidyl ether of 1,1,1-tri(hydroxyphenyl)methane having an epoxide equivalent weight of about 165 containing 750 ppm (parts per million by weight) hydrolyzable chloride and 1950 ppm total aliphatic chloride with various dihydric phenols. The dihydric phenols employed were:

Polyhydric Phenol A was 2,2-bis(3,5-dibromo-4-hydroxyphenyl)propane.

Polyhydric Phenol B was 1,1-di-(3,5-dimethyl-4-hydroxyphenyl)methane.

Polyhydric Phenol C was a 2.1 functional dicyclopentadiene-phenol novolac.

The resultant products were then analyzed for hydrolyzable chloride and total aliphatic chloride content and Mettler softening point. The resins were then cured with 85% of the stoichiometric quantity of diaminodiphenylsulfone for 1 hour (3600 s) at 150° C., then for 2 hours (7200 s) at 200° C., and then for 1 hour (3600 s) at 250° C. The resultant cured products were then subjected to a moisture pick-up test. The results are given in Table I.

The moisture pick-up test consisted of placing weighed 3 mm×18 mm×160 mm coupons in boiling water for 168 hours (604,800 s). The coupons were then removed, allowed to cool at ambient temperature (about 25° C.) for about 15–30 minutes (900–1800 s) after which they were then wiped dry and weighed.

The softening points given in Table I and in the preceding examples were obtained by the Mettler method, a description of which can be found in ASTM D3104-75.

TABLE I

| Reactant or Property | Comp. Expt. A | Ex. 3 | Ex. 4 | Ex. 5 |
|---|---|---|---|---|
| Polyhydric Phenol Type | None | A | B | C |
| grams/100 g of epoxy resin | — | 20.4 | 10.8 | 11.2 |
| Softening Point | 52 | 82 | 80 | 78 |
| Hydrolyzable chloride content, ppm | 750 | 25 | 13 | 7 |
| Total aliphatic chloride content, ppm | 1950 | 910 | 809 | 786 |
| Moisture Pick-up % by weight | 4.8 | 2.4 | 3.3 | 3.2 |

We claim:

1. Advanced, solid, non-sintering epoxy resin which results from reacting (A) at least one triglycidyl ether of a trihydric phenol represented by the following formula I

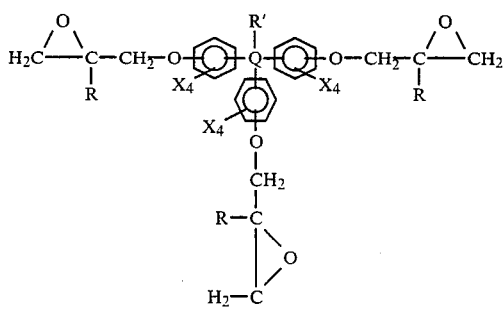

wherein Q is a tetravalent hydrocarbyl group having 1 carbon atom, each R is independently hydrogen or an aliphatic hydrocarbyl group having from 1 to about 3 carbon atoms; each R' is hydrogen or a hydrocarbyl group having from 1 to about 12; and each X is independently hydrogen, a monovalent hydrocarbyl group having from 1 to about 6 carbon atoms or a halogen; with (B) at least one polyhydric phenol having an average hydroxyl functionality of not greater than about 3; wherein components (A) and (B) are employed in quantities which result in a non-sintering advanced epoxy resin.

2. An advanced, solid, non-sintering epoxy resin of claim 1 wherein the ratio of phenolic hdroxyl groups to epoxy groups is from about 0.01:1 to about 0.5:1.

3. An advanced, solid, non-sintering epoxy resin of claim 2 wherein the ratio of phenolic hdroxyl groups to epoxy groups is from about 0.03:1 to about 0.3:1.

4. An advanced, solid, non-sintering epoxy resin of claim 3 wherein the ratio of phenolic hdroxyl groups to epoxy groups is from about 0.05:1 to about 0.2:1.

5. An advanced, solid, non-sintering epoxy resin of claim 1 wherein
component (B) is a polyhydric phenol represented by the following formulas II, III and IV

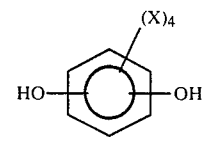

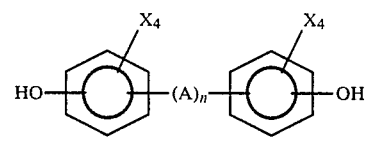

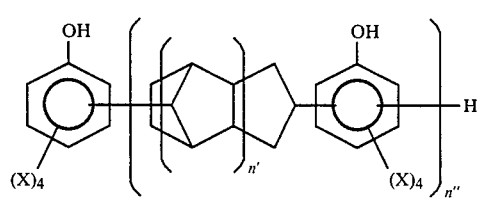

wherein each A is independently a divalent hydrocarbyl group having from about 1 to about 12, —O—, —S—, —S—S—,

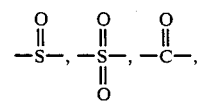

each X is independently hydrogen, a monovalent hydrocarbyl group having from 1 to about 6 carbon atoms or a halogen, n has a value of zero or 1, n' has a value of from about 1 to about 5 and n" has a value from about 1 to about 3.

6. An advanced, solid, non-sintering epoxy resin of claim 5 wherein
  (i) component (A) is a triglylcidyl ether of 1,1,1-tri-(hydroxyphenyl)methane or a triglycidyl ether of (hydroxyphenyl)[di-(hydroxy-2-methylphenyl)]methane or a mixture thereof; and
  (ii) component (B) is 2,2-bis(3,5-dibromo-4-hydroxyphenyl) propane, 3,3',5,5'-tetramethyl-4,4'-dihydroxybiphenyl, 1,2-di-(3,5-dimethyl-4-hydroxy phenyl) ethane, 1,1-di-(3,5-di-methyl-4-hydroxy phenyl) methane, a 2.1 functional dicyclopentadiene-phenol novolac or a mixture thereof.

7. An advanced, solid, non-sintering epoxy resin of claim 2 wherein
component (B) is a polyhydric phenol represented by the following formulas II, III and IV

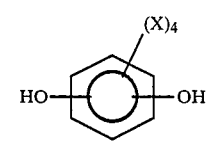

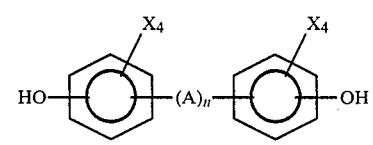

-continued

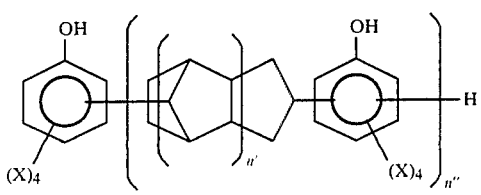

wherein each A is independently a divalent hydrocarbyl group having from about 1 to about 12, —O—, —S—, —S—S—,

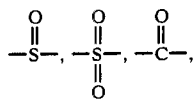

each X is independently hydrogen, a monovalent hydrocarbyl group having from 1 to about 6 carbon atoms or a halogen, n has a value of zero or 1 and n' has a value of from about 1 to about 5 and n" has a value from about 1 to about 3.

8. An advanced, solid, non-sintering epoxy resin of claim 7 wherein
(i) component (A) is a triglylcidyl ether of 1,1,1-tri-(hydroxyphenyl)methane or a triglycidyl ether of (hydroxyphenyl)[di-(hydroxy-2-methylphenyl)]methane or a mixture thereof; and
(ii) component (B) is 2,2-bis(3,5-dibromo-4-hydroxyphenyl) propane, 3,3',5,5'-tetramethyl-4,4'-dihydroxybiphenyl, 1,2-di-(3,5-dimethyl-4-hydroxy phenyl) ethane, 1,1-di-(3,5-dimethyl-4-hydroxy phenyl) methane, a 2.1 functional dicyclopentadiene-phenol novolac or a mixture thereof.

9. An advanced, solid, non-sintering epoxy resin of claim 3 wherein
component (B) is a polyhydric phenol represented by the following formulas II, III and IV

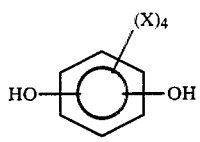

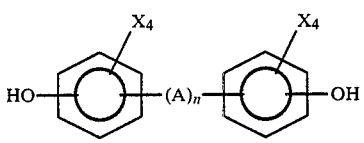

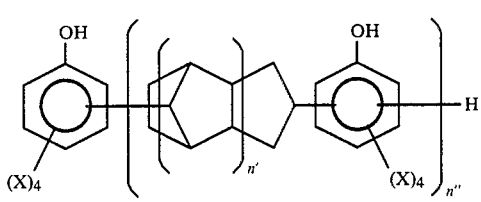

wherein each A is independently a divalent hydrocarbyl group having from about 1 to about 12, —O—, —S—, —S—S—,

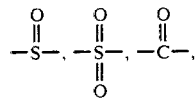

each X is independently hydrogen, a monovalent hydrocarbyl group having from 1 to about 6 carbon atoms or a halogen, n has a value of zero or 1, n' has a value of from about 1 to about 5 and n" has a value from about 1 to about 3.

10. An advanced, solid, non-sintering epoxy resin of claim 9 wherein
(i) component (A) is a triglylcidyl ether of 1,1,1-tri-(hydroxyphenyl)methane or a triglycidyl ether of (hydroxyphenyl)[di-(hydroxy-2-methylphenyl)]methane or a mixture thereof; and
(ii) component (B) is 2,2-bis(3,5-dibromo-4-hydroxyphenyl) propane, 3,3',5,5'-tetramethyl-4,4'-dihydroxybiphenyl, 1,2-di-(3,5-dimethyl-4-hydroxy phenyl) ethane, 1,1-di-(3,5-dimethyl-4-hydroxy phenyl) methane, a 2.1 functional dicyclopentadiene-phenol novolac or a mixture thereof.

11. An advanced, solid, non-sintering epoxy resin of claim 4 wherein
component (B) is a polyhydric phenol represented by the following formulas II, III and IV

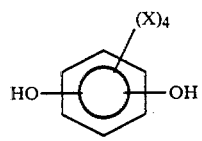

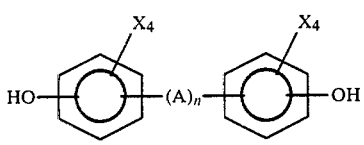

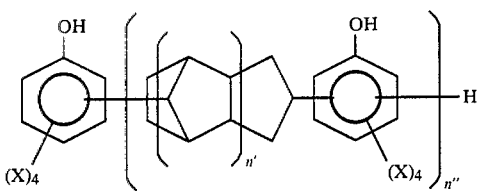

wherein each A is independently a divalent hydrocarbyl group having from about 1 to about 12, —O—, —S—, —S—S—,

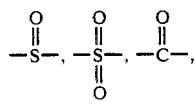

each X is independently hydrogen, a monovalent hydrocarbyl group having from 1 to about 6 carbon atoms or a halogen, n has a value of zero or 1, n' has a value of from about 1 to about 5 and n" has a value from about 1 to about 3.

12. An advanced, solid, non-sintering epoxy resin of claim 11 wherein
(i) component (A) is a triglylcidyl ether of 1,1,1-tri-(hydroxyphenyl)methane or a triglycidyl ether of (hydroxyphenyl)[di-(hydroxy-2-methyl-phenyl)]methane or a mixture thereof; and (ii) component (B) is 2,2-bis(3,5-dibromo-4-hydroxyphenyl) propane, 3,3',5,5'-tetramethyl-4,4'-dihydroxybiphenyl, 1,2-di-(3,5-dimethyl-4-hydroxy phenyl) ethane, 1,1-di-(3,5-dimethyl-4-hydroxy phenyl) methane, a 2.1 functional dicyclopentadiene-phenol novolac or a mixture thereof.

13. A curable composition which comprises an advanced, solid, non-sintering epoxy resin of claim 1 and a curing quantity of at least one curing agent therefor.

14. A curable composition of claim 13 wherein the curing agent is selected from aliphatic, aromatic or cycloaliphatic amines, polybasic carboxylic acid anhydrides, amides, polyhydric phenols, novolac resins, or mixtures thereof.

15. A curable composition of claim 14 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

16. A curable composition which comprises an advanced, solid, non-sintering epoxy resin of claim 2 and a curing quantity of at least one curing agent therefor.

17. A curable composition of claim 16 wherein the curing agent is selected from aliphatic, aromatic or cycloaliphatic amines, polybasic carboxylic acid anhydrides, amides, polyhydric phenols, novolac resins, or mixtures thereof.

18. A curable composition of claim 17 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

19. A curable composition which comprises an advanced, solid, non-sintering epoxy resin of claim 3 and a curing quantity of at least one curing agent therefor.

20. A curable composition of claim 19 wherein the curing agent is selected from aliphatic, aromatic or cycloaliphatic amines, polybasic carboxylic acid anhydrides, amides, polyhydric phenols, novolac resins, or mixtures thereof.

21. A curable composition of claim 20 wherein the curing agent is selected from (bis-(4-aminophenyl)sulfone), aminophenyl sulfonamide, dicyandiamide, phenol formaldehyde novolac resins, cresol formaldehdye novolac resins, m-phenylenediamine, bis(4-aminophenyl)methane, phthalic anhydride, maleic anhydride, 2,2-bis-(4-hydroxyphenyl)propane, or mixtures thereof.

22. A curable composition which comprises an advanced, solid, non-sintering epoxy resin of claim 4 and a curing quantity of at least one curing agent therefor.

23. A curable composition of claim 22 wherein the curing agent is selected from aliphatic, aromatic or cycloaliphatic amines, polybasic carboxylic acid anhydrides, amides, polyhydric phenols, novolac resins, or mixtures thereof.

24. A curable composition of claim 23 wherein the curing agent is selected from (bis-(4-aminophenyl)sulfone), aminophenylsulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

25. A curable composition which comprises an advanced, solid, non-sintering epoxy resin of claim 5 and a curing quantity of at least one curing agent therefor.

26. A curable composition of claim 25 wherein the curing agent is selected from aliphatic, aromatic or cycloaliphatic amines, polybasic carboxylic acid anhydrides, amides, polyhydric phenols, novolac resins, or mixtures thereof.

27. A curable composition of claim 26 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

28. A curable composition which comprises an advanced, solid, non-sintering epoxy resin of claim 6 and a curing quantity of at least one curing agent therefor.

29. A curable composition of claim 28 wherein the curing agent is selected from aliphatic, aromatic or cycloaliphatic amines, polybasic carboxylic acid anhydrides, amides, polyhydric phenols, novolac resins, or mixtures thereof.

30. A curable composition of claim 29 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

31. A curable composition which comprises an advanced, solid, non-sintering epoxy resin of claim 7 and a curing quantity of at least one curing agent therefor.

32. A curable composition of claim 31 wherein the curing agent is selected from aliphatic, aromatic or cycloaliphatic amines, polybasic carboxylic acid anhydrides, amides, polyhydric phenols, novolac resins, or mixtures thereof.

33. A curable composition of claim 32 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

34. A curable composition which comprises an advanced, solid, non-sintering epoxy resin of claim 8 and a curing quantity of at least one curing agent therefor.

35. A curable composition of claim 34 wherein the curing agent is selected from aliphatic, aromatic or cycloaliphatic amines, polybasic carboxylic acid anhydrides, amides, polyhydric phenols, novolac resins, mixtures thereof and the like.

36. A curable composition of claim 35 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

37. A curable composition which comprises an advanced, solid, non-sintering epoxy resin of claim 9 and a curing quantity of at least one curing agent therefor.

38. A curable composition of claim 37 wherein the curing agent is selected from aliphatic, aromatic or cycloaliphatic amines, polybasic carboxylic acid anhydrides, amides, polyhydric phenols, novolac resins, mixtures thereof and the like.

39. A curable composition of claim 38 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

40. A curable composition which comprises an advanced, solid, non-sintering epoxy resin of claim 10 and a curing quantity of at least one curing agent therefor.

41. A curable composition of claim 40 wherein the curing agent is selected from aliphatic, aromatic or cycloaliphatic amines, polybasic carboxylic acid anhydrides, amides, polyhydric phenols, novolac resins, mixtures thereof and the like.

42. A curable composition of claim 41 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

43. A curable composition which comprises an advanced, solid, non-sintering epoxy resin of claim 11 and a curing quantity of at least one curing agent therefor.

44. A curable composition of claim 43 wherein the curing agent is selected from aliphatic, aromatic or cycloaliphatic amines, polybasic carboxylic acid anhydrides, amides, polyhydric phenols, novolac resins, mixtures thereof and the like.

45. A curable composition of claim 44 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

46. A curable composition which comprises an advanced, solid, non-sintering epoxy resin of claim 12 and a curing quantity of at least one curing agent therefor.

47. A curable composition of claim 46 wherein the curing agent is selected from aliphatic, aromatic or cycloaliphatic amines, polybasic carboxylic acid anhydrides, amides, polyhydric phenols, novolac resins, mixtures thereof and the like.

48. A curable composition of claim 47 wherein the curing agent is selected from (bis-(4-aminophenyl)sulfone), aminophenyl sulfonamide, dicyandiamide, phenol formaldehyde novolac resins, cresol formaldehyde novolac resins, m-phenylenediamine, bis(4-aminophenyl)methane, phthalic anhydride, maleic anhydride, 2,2-bis-(4-hydroxyphenyl)propane, or mixtures thereof.

49. The product resulting from curing the composition of claim 13.

50. The product of claim 49 which is an electrical or structural laminate or composite or a semiconductor or other electrical device.

51. The product resulting from curing the composition of claim 14.

52. The product of claim 51 which is an electrical or structural laminate or composite or a semiconductor or other electrical device.

53. The product resulting from curing the composition of claim 15.

54. The product of claim 53 which is an electrical or structural laminate or composite or a semiconductor or other electrical device.

55. The product resulting from curing the composition of claim 16.

56. The product of claim 55 which is an electrical or structural laminate or composite or a semiconductor or other electrical device.

57. The product resulting from curing the composition of claim 17.

58. The product of claim 57 which is an electrical or structural laminate or composite or a semiconductor or other electrical device.

59. The product resulting from curing the composition of claim 18.

60. The product of claim 59 which is an electrical or structural laminate or composite or a semiconductor or other electrical device.

61. The product resulting from curing the composition of claim 19.

62. The product of claim 61 which is an electrical or structural laminate or composite or a semiconductor or other electrical device.

63. The product resulting from curing the composition of claim 20.

64. The product of claim 63 which is an electrical or structural laminate or composite or a semiconductor or other electrical device.

65. The product resulting from curing the composition of claim 21.

66. The product of claim 65 which is an electrical or structural laminate or composite or a semiconductor or other electrical device.

67. The product resulting from curing the composition of claim 22.

68. The product of claim 67 which is an electrical or structural laminate or composite or a semiconductor or other electrical device.

69. The product resulting from curing the composition of claim 23.

70. The product of claim 69 which is an electrical or structural laminate or composite or a semiconductor or other electrical device.

71. The product resulting from curing the composition of claim 24.

72. The product of claim 71 which is an electrical or structural laminate or composite or a semiconductor or other electrical device.

73. The product resulting from curing the composition of claim 25.

74. The product of claim 73 which is an electrical or structural laminate or composite or a semiconductor or other electrical device.

75. The product resulting from curing the composition of claim 26.

76. The product of claim 75 which is an electrical or structural laminate or composite or a semiconductor or other electrical device.

77. The product resulting from curing the composition of claim 27.

78. The product of claim 77 which is an electrical or structural laminate or composite or a semiconductor or other electrical device.

79. The product resulting from curing the composition of claim 28.

80. The product of claim 79 which is an electrical or structural laminate or composite or a semiconductor or other electrical device.

81. The product resulting from curing the composition of claim 29.

82. The product of claim 81 which is an electrical or structural laminate or composite or a semiconductor or other electrical device.

83. The product resulting from curing the composition of claim 30.

84. The product of claim 83 which is an electrical or structural laminate or composite or a semiconductor or other electrical device.

85. The product resulting from curing the composition of claim 31.

86. The product of claim 85 which is an electrical or structural laminate or composite or a semiconductor or other electrical device.

87. The product resulting from curing the composition of claim 32.

88. The product of claim 87 which is an electrical or structural laminate or composite or a semiconductor or other electrical device.

89. The product resulting from curing the composition of claim 33.

90. The product of claim 89 which is an electrical or structural laminate or composite or a semiconductor or other electrical device.

91. The product resulting from curing the composition of claim 34.

92. The product of claim 91 which is an electrical or structural laminate or composite or a semiconductor or other electrical device.

93. The product resulting from curing the composition of claim 35.

94. The product of claim 93 which is an electrical or structural laminate or composite or a semiconductor or other electrical device.

95. The product resulting from curing the composition of claim 36.

96. The product of claim 95 which is an electrical or structural laminate or composite or a semiconductor or other electrical device.

97. The product resulting from curing the composition of claim 37.

98. The product of claim 97 which is an electrical or structural laminate or composite or a semiconductor or other electrical device.

99. The product resulting from curing the composition of claim 38.

100. The product of claim 99 which is an electrical or structural laminate or composite or a semiconductor or other electrical device.

101. The product resulting from curing the composition of claim 39.

102. The product of claim 101 which is an electrical or structural laminate or composite or a semiconductor or other electrical device.

103. The product resulting from curing the composition of claim 40.

104. The product of claim 103 which is an electrical or structural laminate or composite or a semiconductor or other electrical device.

105. The product resulting from curing the composition of claim 41.

106. The product of claim 105 which is an electrical or structural laminate or composite or a semiconductor or other electrical device.

107. The product resulting from curing the composition of claim 42.

108. The product of claim 107 which is an electrical or structural laminate or composite or a semiconductor or other electrical device.

109. The product resulting from curing the composition of claim 43.

110. The product of claim 109 which is an electrical or structural laminate or composite or a semiconductor or other electrical device.

111. The product resulting from curing the composition of claim 44.

112. The product of claim 111 which is an electrical or structural laminate or composite or a semiconductor or other electrical device.

113. The product resulting from curing the composition of claim 45.

114. The product of claim 113 which is an electrical or structural laminate or composite or a semiconductor or other electrical device.

115. The product resulting from curing the composition of claim 46.

116. The product of claim 115 which is an electrical or structural laminate or composite or a semiconductor or other electrical device.

117. The product resulting from curing the composition of claim 47.

118. The product of claim 117 which is an electrical or structural laminate or composite or a semiconductor or other electrical device.

119. The, product resulting from curing the composition of claim 48.

120. The product of claim 119 which is an electrical or structural laminate or composite or a semiconductor or other electrical device.

* * * * *